United States Patent
Farrell

[11] 3,910,743
[45] Oct. 7, 1975

[54] APPLICATION OF PARISON TO BALLOON COVERED CORE ROD

[75] Inventor: John J. Farrell, Green Brook, N.J.

[73] Assignee: Farrell Patent Company, Greenbrook, N.J.

[22] Filed: Oct. 4, 1974

[21] Appl. No.: 512,250

[52] U.S. Cl. ........ 425/249; 425/250; 425/DIG. 209; 425/DIG. 211; 264/97
[51] Int. Cl.² ............................................. B29F 1/00
[58] Field of Search ........... 425/242, 129, 130, 134, 425/244, 247, 249, 261, 347, 450, 448, 245, 249, DIG. 208, DIG. 209, DIG. 211, DIG. 213, DIG. 214, DIG. 215, 389, 242 B, 324 B, 387 B; 264/314, 97

[56] References Cited
UNITED STATES PATENTS

| | | |
|---|---|---|
| 3,032,823 | 5/1962 | Sherman ............................. 264/314 |
| 3,778,211 | 12/1973 | Moen et al. ...................... 425/245 R |
| 3,816,046 | 6/1974 | Farrel ............................. 425/324 B |

Primary Examiner—Francis S. Husar
Assistant Examiner—Robert J. Charvat
Attorney, Agent, or Firm—Marvin Feldman; J. B. Felshin

[57] ABSTRACT

This invention controls the application of a parison to a core rod in the cavity of the injection mold of injection blow molding apparatus. The invention is particularly useful for core rods that include a balloon which covers the outside surface of the core rod and over which the parison is applied. Elastomer material of which the balloon is made is eventually eroded by the hot blast of plastic injection against the end of the core rod in the conventional manner. This invention covers most of the core rod with a protecting metal tube in the mold cavity and applies the plastic as a rolling wave instead of a blast impact.

13 Claims, 5 Drawing Figures

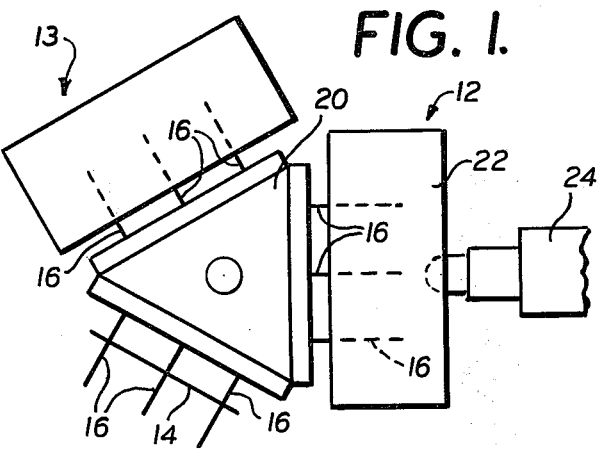
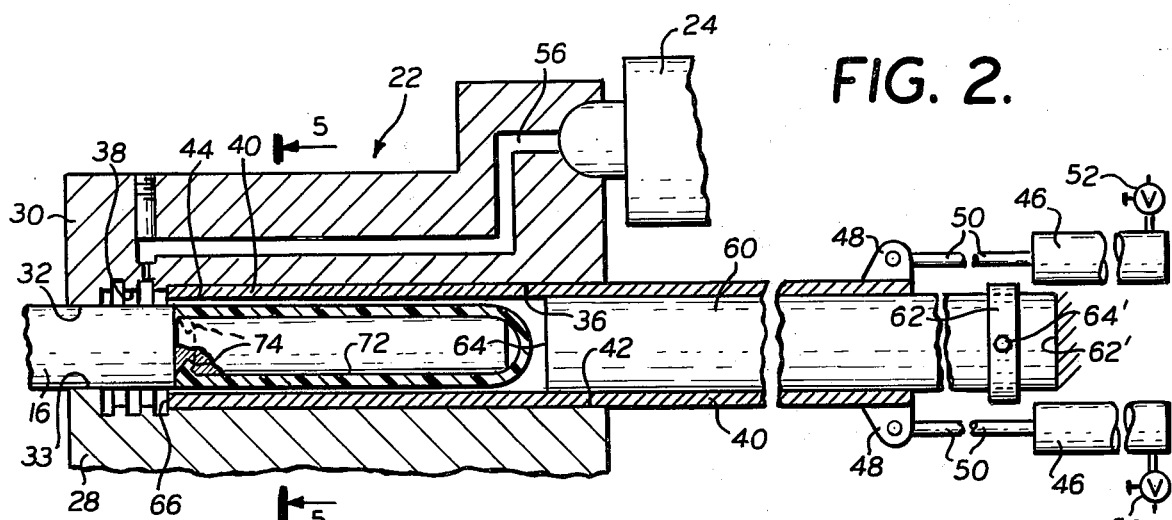
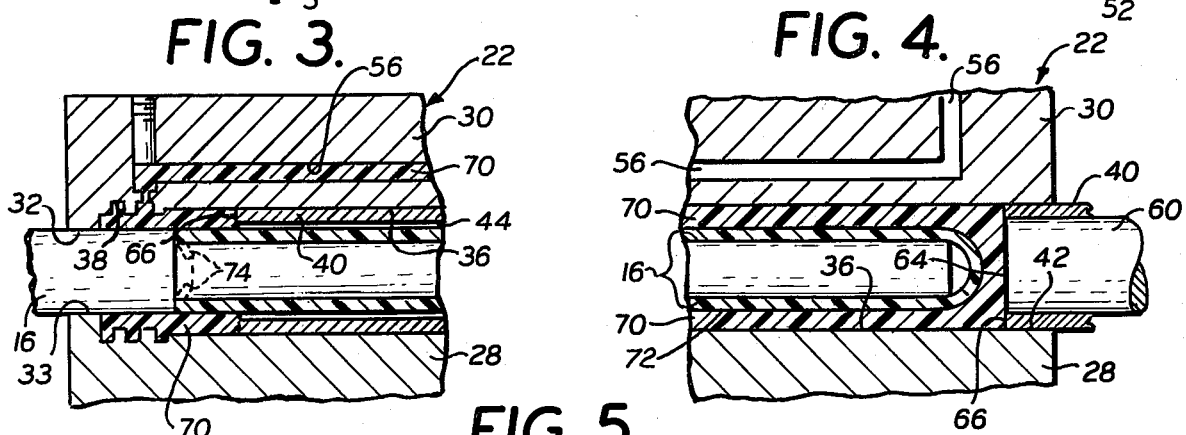
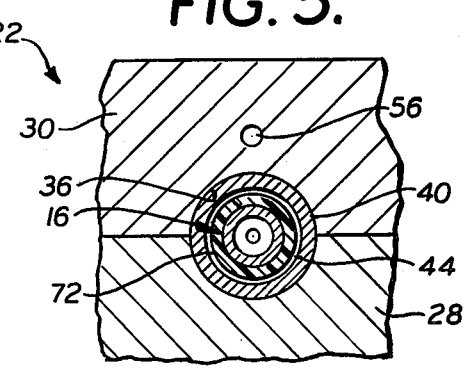

3,910,743

APPLICATION OF PARISON TO BALLOON COVERED CORE ROD

BACKGROUND AND SUMMARY OF THE INVENTION

In the ordinary injection mold of a conventional blow molding apparatus, the core rod extends through a side of the mold and into the mold cavity; and the semi-liquid and molten plastic is injected into the mold cavity from the end opposite to that through which the core rod extends. The molten plastic is discharged into the mold cavity against the free end of the core rod and the material spreads in all directions around the core rod to fill the cavity and form a parison around the core rod.

In some of the later developed blow molding techniques, the core rod has a covering made of elastomer material which forms a "balloon" that hugs the core rod when the balloon is deflated. After a parison has been applied over the core rod, with the balloon between the metal core rod and the plastic of the parison, the core rod is withdrawn from the injection mold and is transferred to other stations.

There are a number of different advantages in having the parison blown by blowing the balloon so that the blowing fluid does not touch the plastic of the parison. One of these advantages is that cooling liquid can be used in the balloon so that the parison is being cooled from the inside by the cooling fluid in the balloon and from the outside by contact with the walls of a blow mold chamber or by contact with air streams.

This invention is concerned with an improved construction for applying the parison over a core rod and particularly over a core rod which is covered by a balloon. Instead of injecting the molten material into the cavity at the free end of the core rod and against the end of the core rod, this invention injects the plastic into the cavity of the injection mold at the neck end of the core rod. The application of the plastic to the surface of the core rod is then controlled by having a tube which surrounds the core rod and which fills most of the injection mold cavity.

As the plastic material enters the mold cavity, the tube is withdrawn and the plastic material contacts with the end face of the tube and advances as the tube withdraws so as to apply the plastic material to the core rod as a wave of plastic which rolls down the length of the core rod as the tube withdraws.

For core rods which have a balloon on their outer surface, this invention is particularly useful because the core rod can be covered with the balloon for the portion of the length of the parison that is to be expanded in the blow mold; but the portion of the parison which forms the neck or upper end of a blown object, such as a container, and which is not expanded in the blow mold, the parison can be applied directly to the bare metal of the core rod beyond the end of the balloon. This means that the initial flow of semi-liquid or hot plastic into the cavity strikes against a metal surface of the core rod and against an end face of a tube which covers the balloon on the core rod.

As more plastic enters the mold cavity, the tube withdraws and exposes progressively greater lengths of the balloon covering and the plastic material advances lengthwise over the balloon in a wave of plastic as the tube withdraws from the cavity.

Even if the invention is made without the feature of bare core rod surface at the injection location in the cavity, the invention still has the advantage that the molten plastic is applied at the neck end of the core rod where there is ample metal into which excess heat can flow and the elastomer material with which the plastic comes in contact is not as highly heated in a blow molding apparatus where the molten plastic is injected against the free end of the core rod.

Other object, features and advantages of the invention will appear or be pointed out as the description proceeds.

BRIEF DESCRIPTION OF DRAWING

In the drawing, forming a part hereof, in which like reference characters indicate corresponding parts in all the views.

FIG. 1 is a diagrammatic top plan view of an injection blow molding apparatus;

FIG. 2 is a diagrammatic sectional view of an injection mold which can be used with the apparatus shown in FIG. 1;

FIG. 3 is a detail view showing the structure of FIG. 2 when the injection mold is partially filled with semi-liquid plastic;

FIG. 4 is a view similar to FIG. 3 but showing the injection mold fully filled; and FIG. 5 is a sectional view taken on the line 5—5 of FIG. 2.

DESCRIPTION OF PREFERRED EMBODIMENT

FIG. 1 shows injection blow molding apparatus including an injection station 12, a blowing station 13 and a stripper station 14. Core rods 16 extend from the three faces of an indexing table 20. The core rods extend into the molds at the operational stations 12 and 13 and extend to the stripper mechanism at the stripper station 14.

Semi-liquid molten plastic material is injected into an injection mold 22, at the injection station 12, by a plasticizer 24. The portions of the core rod 16 which extend into the injection mold 22 are coated with plastic parisons. The stations 12 and 13 then open, the indexing head 20 turns 120°, new core rods are positioned in the molds at the stations 12 and 13 and the molds close. New parisons are then applied to the new core rods in the mold 22 while the parisons in the mold at the blow station are expanded to fill the blow mold cavities. This is all in accordance with conventional injection blow molding operation which is well understood in the art and no further explanation of it is necessary for a complete understanding of this invention.

FIG. 2 shows the mold 22 which includes a stationary lower section 28 and a movable upper section 30 which moves toward and from the lower section 28 to close and open, respectively, the mold 22. The neck end of the core rod 16 extends through an opening in the left hand end of the mold 22 and is firmly clamped between semi-cylindrical sides 32 and 33 of the upper and lower sections of the mold 22 in accordance with conventional practice.

Within the mold 22 there is a mold cavity including a portion 36 which is of cylindrical cross section and a neck portion 38 which has the shape of the neck of the article that is to be made by the injection blow molding apparatus. In FIG. 2 this neck portion 38 is shaped to mold a thread for the neck of the container. This neck is molded to its final shape in the injection mold 22; that is, it is not to be expanded during the blowing operation.

A tube 40 extends into the cavity 36, 38 and fills substantially all of the space in the cavity between the core rod 16 and the walls of the cavity. The inside diameter of the tube 40 is slightly greater than the outside diameter of the core rod 16. The outside diameter of the tube 40 is substantially the same as the diameter of the cavity 36 but it fits into the cavity with a running fit so that it can slide freely lengthwise in the cavity 36.

The tube 40 extends through an opening 42 in the end of the mold 22 opposite to the opening through which the core rod extends into the mold cavity. This opening 42 is of the same diameter as the cavity 36.

There is a small clearance, indicated by the reference character 44, between the core rod and the inside surface of the tube 40 but the clearances at both the inside and outside surfaces of the tube 40 and the cavity wall and core rod are not sufficient for the semi-liquid material, which is supplied to the cavity 36, 38, to flow through these clearances. Thus the material admitted into the cavity portion 38 cannot flow into the cavity portion 36 as long as the tube 40 is in a position extending all the way to the neck end of the cavity. In order for the injection mold cavity to fill with plastic material, the tube 40 has to be withdrawn from the cavity 36; and it can be withdrawn from the cavity by pressure of the injected plastic into the mold cavity of the mold 22.

When pressure of the semi-liquid plastic is relied upon to push the tube 40 to the right, the rate at which the tube 40 is withdrawn from the mold cavity is regulated by cylinder-and-piston devices 46 which can be used as dash pots or which can be used as motors.

These cylinder-and-piston devices 46 have connections 48 with the tube 40 by brackets which connect with piston rods 50. The exhaust of working fluid from the cylinder-and-piston devices 46 is controlled by valves 52 during movement of teh tube 40 toward the right; and if the cylinder-and-piston devices 46 are used as motors, then the valves 42 can admit working fluid to the cylinder-and-piston devices 46 to restore the tube 40 to its original fully inserted position in the mold after each transfer of a parison from the mold and the introduction of a new core rod into the mold.

The molten plastic material from the plasticizer 24 flows through the upper section of the mold 22 through a paassage 56 which opens into the neck portion 38 of the mold cavity 36. The plasticizer 24 withdraws after each injection operation, to permit the uppermost section 30 to move into open position.

There is a rod or shaft 60 which extends into the tube 40 and which fits closely within the tube 40 with a running fit. The rod or shaft 60 is held in a fixed position as indicated by its fixed end 62'. Like the tube 40, the shaft 60 is in axial alignment with the core rod 16. The tube 40 slides on the shaft 60 during its withdrawal from the injection mold cavity and during its reinsertion into the injection mold cavity after the completion of each injection operation. Thus the outside surface of the shaft 60 provides additional bearing surface on which the tube 40 slides. In the construction illustrated there is a collar 62 on the shaft 60 in position to serve as an abutment for stopping movement of the tube 40 toward the right. This collar 62 is preferably adjustable lengthwise of the shaft 60 and it has a set screw 64' for holding the collar securely in any adjusted position.

The end face of the shaft 60 at the left hand end of the shaft provides a wall 64 which is, in effect, a portion of the end wall of the injection mold cavity 36. The remainder of the end wall at the right hand end of the injection mold cavity 36 is provided by the left hand end face 66 of the tube 40 and the end face 64 of the shaft 60; and the end face 66 of the tube 40 are preferably in a common plane when the tube 40 is at the right hand limit of its withdrawal travel, as shown in FIG. 4.

FIG. 3 shows the way in which semi-liquid molten plastic 70 flows through the passages 56 and into the neck end portion 38 of the injection mold cavity. The plastic 70 fills the neck portion 38 and presses against the end face 66 of the tube 40 and advances as a wave as the tube 40 withdraws. The hottest plastic is thus introduced into the mold cavity at the neck portion of the cavity where there is metal of the core rod extending from the mold and capable of carrying heat away from the hot plastic. As the plastic advances to the right, in contact with the wall of the mold cavity, it loses some heat and thus the temperature of the plastic has reached a substantially lower temperature by the time it travels to the end of the mold cavity 36, as shown in FIG. 4.

The core rod 16, shown in the drawings, is coated with a balloon 72 which is made of elastomeric material and which hugs the outer portion of the core rod 16 except when the balloon is inflated. Provision is made for blowing fluid from the interior of the core rod 16 into contact with the inside surface of the balloon 72, to partially or fully inflate the balloon 72. The construction of a core rod with such a balloon as its outside surface is disclosed in U.S. Pat. No. 3,816,046 June 11, 1974.

FIG. 2 shows the balloon 72 with an upper rim 74 which fits into a circumferential groove in the metal inner part of the core rod 16. This construction is also known in balloon type core rods.

As also shown in FIG. 2, the balloon 72 covers the portion of the core rod from which the parison is to be blown but does not cover that portion of the core rod that is in the neck end of the parison which acquires its final shape in the injection mold. Thus the construction illustrated supplies the initial flow of molten plastic against the part of the core rod that has a bare metal surface, and the molten plastic does not contact with the material of the balloon until after it has come up against the end face 66 of the tube 40 as well as the bare metal of the core rod 16. The useful life of the balloon 72 is thus extended by eliminating any blast contact of the plastic with the balloon surface and by reducing the temperature at which the plastic comes in contact with the balloon.

Even if the core rod 16 is made with the balloon surface extending for its full length, the gating of the injection cavity at neck end and with the tube 40 for reducing temperature and controlling the flow of the plastic, as it forms a parison over the core rod, extends the useful life of the balloon.

FIG. 4 shows the tube 40 fully withdrawn from the cavity 36 and with the end face of the tube forming a portion of the end wall of the injection mold cavity 36.

The preferred embodiment of the invention has been illustrated and described, but changes and modifications can be made, and some features can be used in different combinations without departing from the invention as defined in the claims.

What is claimed is:

1. Injection blow molding apparatus including core rods, an injection mold, a blowing mold, supporting structure for the core rods movable to transfer the core rods from one mold to the next, means for injecting semi-liquid plastic into the injection mold, the injection mold having an opening at one end through which a core rod extends into a cavity in the injection mold, a tube that extends into the cavity from the end opposite the core rod, the tube being in axial alignment with the core rod and having an inside diameter slightly greater than the outside diameter of the core rod so that there is some clearance between the core rod and the tube, a bearing on which the tube moves axially to withdraw the tube from the cavity, means for stopping the withdrawing of the tube when the end face of the tube reaches a position where it constitutes, in effect, a part of an end wall of the cavity, and a wall in the tube constituting, in effect, another part of the end wall of the cavity.

2. The injection blow molding apparatus described in claim 1 characterized by the injection mold cavity being of substantially cylindrical cross section, the outside diameter of the tube being substantially equal to the diameter of the cavity, and fitting within the cavity with a running fit.

3. The injection blow molding apparatus described in claim 1 characterized by bearing surfaces on which the tube is movable axially, the tube having an end face in the cavity against which the injected plastic exerts pressure to impart the withdrawing movement to the tube.

4. The injection blow molding apparatus described in claim 3 characterized by a fixed cylindrical element that extends into the tube and the surface of which provides a bearing on which the tube moves axially, the end face of the cylindrical element being said wall in the tube.

5. The injection blow molding apparatus described in claim 1 characterized by the means for stopping the withdrawing of the tube being an abutment that is adjustable parallel to the axis of movement of the tube, and means for holding the abutment locked in any of its adjusted positions.

6. The injection blow molding apparatus described in claim 1 characterized by the core rod including a balloon that hugs the underlying portion of the core rod and that provides an expandable surface which is coated with a parison in the injection mold.

7. The injection blow molding apparatus described in claim 1 characterized by the means for injecting semi-liquid plastic into the injection mold including a passage tha opens into the injection mold cavity adjacent to the end face of the tube when the tube is fully extended into the mold cavity, the clearance between the core rod and the inside surface of the tube being of a width that blocks flow of the semi-liquid plastic that is injected into the injection mold so that the application of the plastic to the surface of the core rod is progressive at the rate at which the tube withdraws from the cavity.

8. The injection blow molding apparatus described in claim 1 characterized by means connected with the tube for limiting the rate at which the tube withdraws from the injection cavity.

9. The injection blow molding apparatus described in claim 8 characterized by the means for limiting the rate at which the tube withdraws from the cavity including a dash pot.

10. The injection blow molding apparatus described in claim 1 characterized by a cylinder-and-piston device connected between the tube at a relatively fixed location, and operable as a motor or a dash pot for controlling the withdrawal of the tube from the injection mold cavity and the rate of such withdrawal.

11. The injection blow molding apparatus described in claim 6 characterized by the balloon covering the portion of the core rod from which the parison is to be blown, and terminating short of the neck portion of the parison that is not to be blown, and the tube, when fully extended into the injection mold cavity, covering the length of the core rod that is covered by the balloon.

12. The injection blow molding apparatus described in claim 11 characterized by the means for injecting semiliquid plastic into the injection mold including a passage that opens into the injection mold cavity at a part of the core rod that is coated with a portion of the parison that is not to be expanded in the blow mold.

13. The injection blow molding apparatus described in claim 6 characterized by the clearance between the core rod and the inside surface of the tube being of a width that blocks flow of the semi-liquid plastic that is injected into the injection mold from said passage so that the application of the plastic material to the surface of the core rod that is covered by the balloon is in the form of a wave that contacts with and follows the end face of the tube as the tube withdraws from the injection mold cavity and exposes progressively additional lengths of the balloon.

* * * * *